United States Patent [19]
Hurlock et al.

[11] 3,920,599
[45] Nov. 18, 1975

[54] LATICES OF DIALLY DIMETHYL AMMONIUM CHLORIDE/ACRYLAMIDE POLYMERS

[75] Inventors: John R. Hurlock, Hickory Hills; Edward G. Ballweber, Glenwood; Lawrence J. Connelly, Oak Lawn, all of Ill.

[73] Assignee: Nalco Chemical Company, Oak Brook, Ill.

[22] Filed: Mar. 29, 1974

[21] Appl. No.: 456,340

[52] U.S. Cl. .............. 260/29.64; 260/29.6 PM; 260/29.6 HN; 260/29.6 WQ; 260/34.2
[51] Int. Cl.² .......................................... C08F 2/32
[58] Field of Search...... 260/34.2, 29.6 PM, 29.6 H, 260/29.6 WQ, 29.6 HN

[56] References Cited
UNITED STATES PATENTS

| | | | |
|---|---|---|---|
| 3,284,393 | 11/1966 | Vanderhoff et al. | 260/80.3 R |
| 3,734,873 | 5/1973 | Anderson et al. | 260/29.6 B |
| 3,790,477 | 2/1974 | Nielsen et al. | 210/47 |
| 3,826,771 | 7/1974 | Anderson et al. | 260/29.6 WQ |

OTHER PUBLICATIONS

Schildknecht, Allyl Compounds inter alia, Vol. 28, High Polymers, Wiley–Interscience, (1973), pp. 538–546.

*Primary Examiner*—H. S. Cockeram
*Attorney, Agent, or Firm*—John G. Premo; John S. Roberts

[57] ABSTRACT

The preparation of homopolymers of diallyl dimethyl ammonium chloride (DADMAC) and copolymers thereof with acrylamide utilizing a water-in-oil emulsion polymerization technique to produce extremely stable polymer latices and subsequently inverting these emulsions in water, preferably with a suitable hydrophilic and water-soluble surfactant.

2 Claims, No Drawings

LATICES OF DIALLY DIMETHYL AMMONIUM CHLORIDE/ACRYLAMIDE POLYMERS

The present invention is directed towards methods of producing homopolymers of diallyl dimethyl ammonium chloride (DADMAC) and copolymers thereof with acrylamide. These are water-soluble polymers and in both cases the molecular weight, although it may vary over a wide range (for example, 10,000 to 25 million), finds the greatest usefulness in the area, especially the copolymer, of a molecular weight 100,000 ($10^5$) to 1,000,000 ($10^6$).

DADMAC is a quaternary monomer and, when polymerized, yields cationic water-soluble polymers. The homopolymerization of acrylamide, on the other hand, yields an essential non-ionic polymer, polyacrylamide (PAM), but the combination of the copolymer of DADMAC and acrylamide will be cationic, though to a lesser extent than the homopolymer of DADMAC. The percent of each component of the copolymer calculated from the weight percent of monomer may range from DADMAC/PAM 95/5 to 5/95.

The solution polymerization of DADMAC and copolymers thereof, especially copolymers of DADMAC and acrylamide, is known in the prior art.

PRIOR ART BEARING ON SOLUTION POLYMERIZATION AND PRODUCTS

U.S. Pat. No. 2,923,701 Schuller et al. (American Cyanamid)

Examples 3–6 describe the preparation of copolymers of acrylamide and DADMAC in aqueous solution utilizing a redox catalyst consisting of ammonium persulfate and potassium metabisulfite. In Example 6, utilizing 87 mole percent acrylamide and about 13 mole percent DADMAC, the resulting copolymer exhibited a Brookfield viscosity of 14,000 cps and a pH of about 2.

U.S. Pat. No. 3,288,770 Butler (Peninsular ChemResearch)

The patentee polymerizes DADMAC utilizing a free radical polymerization catalyst such as t-butyl peroxide to produce a cyclic repeating structure of high molecular weight. The polymerization is believed contingent on the presence of the chloride ion. The intrinsic viscosity of the products produced by this process is utilized as an indication of molecular weight wherein the intrinsic viscosity in 0.1 normal potassium chloride ranged from 0.5 to about 2.0.

U.S. Pat. No. 3,461,163 Boothe (Calgon)

Synthesis of a highly pure DADMAC from allyl chloride, dimethylamine, and inorganic alkalies facilitated by using a low allyl chloride concentration and a high dimethylamine concentration while maintaining the pH within the range of 12–14.

U.S. Pat. No. 3,562,226 Gayley et al (Calgon)

Utilization of small amounts of copolymers of acrylamide and DADMAC as friction-reducing compounds in oil well fracturing. The patentee at column 2 mentions high molecular weight polymers produced from weight ratios of acrylamide to DADMAC 50/50, 75/25, 85/15, and 90/10.

The present invention, as opposed to solution polymerization, envisages the product of a homo- or copolymer as a water-in-oil emulsion or latex and which may subsequently be inverted in water to a solution usually with the assistance of a hydrophilic surfactant, such as polyoxyethylene(3)octyl phenol. The polymerization necessary to produce such an emulsion may be achieved by following the teachings of U.S. Pat. No. 3,284,393 Vanderhoff et al. (Dow Chemical) where DADMAC or a mixture of DADMAC and acrylamide in water is polymerized in an organic vehicle such as xylene, Isopar M (mixture of purified isoparaffins—Exxon), etc., together with a water-in-oil emulsifier; e.g., sorbitan monostearate. The product which is a polymer latex or water-in-oil emulsion preferably having molecular weight of at least 100,000 to 1 million is characterized by its stability to maintain a dispersion throughout the emulsion for a period of at least 3 weeks, is capable of being reformed with slight agitation, and may be inverted in water rapidly to form a solution.

Additionally, the polymer concentration with respect to the emulsion varies between 20 and 50% by weight and the particle size of the polymer is within the range $5\mu\mu$ to $5\mu$ and preferably in the range $2\mu\mu$ to $5\mu$. Intrinsic viscosity varies between 0.50 and 1.00.

PATENTS RELATIVE TO THE LATEX POLYMER TECHNIQUE

U.S. Pat. No. 3,284,393 Vanderhoff et al. (Dow)

The polymerization of water-soluble monomers by a water-in-oil emulsion polymerization process. The typical parameters of the process as set out in columns 1 and 2, and Examples 5–9 and 15, are particularly applicable to polyacrylamide.

U.S. Pat. No. 3,734,873, Anderson et al. (Nalco)

First dispersing water-soluble vinyl addition polymers in a water-in-oil emulsion and then inverting these polymers in water. Polymer particles are in the range of $5\mu\mu$ to $5\mu$.

U.S. Pat. No. 3,790,476 Spoerle et al. (Nalco)

Dewatering industrial waste by the addition of a water-soluble vinyl addition polymer made by the inversion of a polymeric latex.

U.S. Pat. No. 3,790,477 Nielsen et al (Nalco)

Dewatering solids from sewage by the addition of an aqueous solution of a water-soluble vinyl addition polymer made by the inversion of a polymeric latex.

LITERATURE OF INTEREST

Schildknecht, *Allyl Compounds and Their Polymers*, Vol. 28, Series of Monographs, High Polymers, Wiley Interscience (1973), 538–546.

The present process, as compared with the known solution polymerization method, has produced polymers which in some instances were of higher purity and specially as to the copolymers the DADMAC monomer was polymerized more easily.

GENERALIZED POLYMERIZATION PROTOCOL

In general, the water-in-oil polymer emulsion may be prepared by using as a solvent any of the organic liquids set out in U.S. Pat. No. 3,734,873 Anderson et al. (cf. ante) and restated below.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil & Refining Company under the trade name "Isopar M." Typical specifications of this narrow-cut isoparaffinic solvent are set forth below in Table I:

TABLE I

| Specification Properties | Minimum | Maximum | Test Method |
|---|---|---|---|
| Gravity, API at 60/60°F | 48.0 | 51.0 | ASTM D 287 |
| Color, Saybolt | 30 | — | ASTM D 156 |
| Aniline point, °F | 185 | — | ASTM D 611 |
| Sulfur, p.p.m. | — | 10 | ASTM D 1266 (nephelometric mod.) |
| Distillation, °F: | | | |
| IBP | 400 | 410) | |
| Dry point | — | 495) | ASTM D 86 |
| Flash point, °F (Pensky-Martens closed cup) | 160 | — | ASTM D 93 |

The emulsifier, again as noted from the Anderson patent, may be selected from low HLB materials summarized in the Atlas HLB Surfactant Selector noting that a preferred low HLB emulsifier is sorbitan monooleate.

The initiator may be any free radical yielding initiator used in polymerizing ethylenically unsaturated monomers such as benzoyl peroxide, lauroyl peroxide, potassium persulfate, and the like, as set out directly in U.S. Pat. No. 3,284,393 Vanderhoff (Dow) at column 2, lines 29–47.

PROTOCOL

Step 1. The solvent, initiator, and monomer solution are added (in that order) to a suitable container equipped with a means of agitation equivalent to about 1,000 rpm in laboratory-type equipment.

Step 2. The water-in-oil emulsion formed in Step 1 is purged with an inert gas such as nitrogen. A suggested technique is to move the inert gas over the liquid at a rate of at least 1,000 cc per minute for about 30 minutes.

Step 3. The monomer water-in-oil emulsion is heated to about 75°–77°C for 4 hours.

Step 4. The emulsion of Step 3 is heated for an additional 2 hours at 85°–87°C. The products generally showed a latex viscosity in the range of about 3,000 cps, a polymer conversion of > 90%, and an intrinsic viscosity of about 0.7.

In general with respect to the polymerization techniques utilizing other ethylenically unsaturated monomers such as acrylamide, the temperatures in the present process were higher due to the fact that DADMAC has a slower reaction rate.

EXAMPLE 1

DADMAC Homopolymerization in Latex

Into a 500 ml flask were loaded the following reagents:
  51.6 g Isopar M (a highly purified spectra of isoparaffins—Exxon)
  8.06 g Span 80 (sorbitan monooleate—ICI America)
Then was added:
  2.4 g of the initiator Vazo 64 (azobisisobutyronitrile—DuPont)
Finally the monomer solution was added:
  112.0 g monomeric DADMAC
  43.2 g DI $H_2O$
  200 ppm Versene (sodium EDTA chelate—Dow)

The agitation speed on the stirrer in the flask was adjusted to 900–1000 rpm. Heat was applied at 75°C for 4 hours and then additionally 85°C for 2 hours. The polymeric product recovered had a Brookfield viscosity of 3150 cps; an intrinsic viscosity of 0.71; molecular weight $0.12 \times 10^6$.

EXAMPLE 2

In the same manner as the procedure of Example 1 but utilizing a change of solvent amount as well as initiator as set out below, the procedure was repeated.

Solvent 34.5 g Isopar M
  4.0 g Span 80

Initiator 0.08 g (.1%) $(NH_4)_2S_2O_8$

The resulting polymer exhibited a Brookfield viscosity of 5890 and there was a 51.8% conversion. The intrinsic viscosity for a 1% solution is 0.75. The molecular weight was $0.13 \times 10^6$.

EXAMPLE 3

DADMAC/Acrylamide Polymer Latex

In a manner similar to Example 1, the following recipe was utilized to produce a copolymer emulsion:

| | Grams |
|---|---|
| Commercial xylene | 1225 |
| 55.8% acrylamide solution in water | 525 |
| 36.6% aqueous solution of DADMAC | 263 |
| Sorbitan monooleate | 150 |
| Sodium hydroxide as a 5% aqueous solution | 0.2286 |
| Benzyl peroxide | 0.1225 |
| Lauroyl peroxide | 0.1225 |

The sorbitan monooleate was reacted with sodium hydroxide to form an emulsifier which was then dissolved in xylene. A small quantity of the sodium (4) salt of EDTA was added to the acrylamide monomer for chelating purposes. The emulsifying solution was then added to a portion of the total charge and agitated to form a crude emulsion. The emulsion was homogenized and added to the reactor with agitation, together with the catalyst mixture to assist in forming a product in the range $5\mu\mu$ to $5\mu$ particle size. The emulsion was then purged with nitrogen throughout the run. Polymerization was achieved by heating to about 75°C for 4 hours and then 85°C for 2 hours.

The formed polymeric water-in-oil emulsion was visually observed for breakdown for a period of 30 days. Of ten samples used, eight remained clear for the entire period; and in the other two samples, a slight agitation reformed the emulsion.

Additional experiments were performed wherein the total polymer phase was worked between 30–70% by weight of the emulsion and other low HLB emulsifiers were substituted for sorbitan monooleate with similar results.

An additional sample of the product was inverted into solution in water using a hydrophilic surfactant such as polyoxyethylene(3)octyl phenol. Additional experiments added the surfactant (a) to the water or (b) to the organic solvent and polyoxyethylene monolaurate and other similar surfactants were utilized.

We claim:

1. A stable water-in-oil polymer emulsion selected from the group consisting of a diallyl dimethyl ammonium chloride homopolymer and copolymers of diallyl dimethyl ammonium chloride/acrylamide prepared by a method which comprises (a) preparing a water-in-oil monomer emulsion; (b) polymerizing with agitation in the presence of a low HLB emulsifier and a free radical initiator at a temperature of 75°–90°C for a period of about 6–7 hours to produce the water-in-oil polymer emulsion; and (c) recovering said polymer with a latex Brookfield viscosity of about 300–5000 cps and an intrinsic viscosity of about 0.50–1.00 and wherein the concentration of the polymer lies between 20–50% by weight of the emulsion and the particle size is within the range of $5\mu\mu$ to $5\mu$, said polymer emulsion being characterized by rapid inversion in water to a solution in the presence of a hydrophilic surfactant.

2. The emulsion of claim 1 wherein during the polymerization of the monomer emulsion (a), the heating is carried out at 75°–77°C for about 4 hours and 85°–87°C for an additional 2 hours.

* * * * *